United States Patent [19]
Forslund

[11] 3,972,430
[45] Aug. 3, 1976

[54] CRANE JIB ARRANGEMENT
[75] Inventor: Erik Torsten Forslund, Alfta, Sweden
[73] Assignee: Ostbergs Fabriks AB, Alfta, Sweden
[22] Filed: Oct. 10, 1973
[21] Appl. No.: 404,897

[30] Foreign Application Priority Data
Oct. 13, 1972 Sweden.............................. 13227/72

[52] U.S. Cl.............................. 214/147 G; 212/44
[51] Int. Cl.² ........................................... B66C 1/68
[58] Field of Search.......... 214/147 R, 147 G, 77 R; 212/42, 42.5, 44, 62

[56] References Cited
UNITED STATES PATENTS
2,788,143   4/1957   Tendresse...................... 214/147 G Primary Examiner—L. J. Paperner
Assistant Examiner—George F. Abraham
Attorney, Agent, or Firm—Pierce, Scheffler & Parker

[57] ABSTRACT

A crane jib includes a support, a base arm pivoted in the support, and a jib lever pivotally connected to the base arm. The jib lever supports at its free end a work tool and is oscillated on its support by two hydraulic jacks, the first of the jacks is placed at a point from the journal place of the base arm, while the second jack is placed adjacent the jib lever. The second hydraulic jack has its line of action approximately parallel to a line through the bearing points of the base arm, while its lower bearing point is disposed at a lower level than the bearing place of the base arm.

1 Claim, 1 Drawing Figure

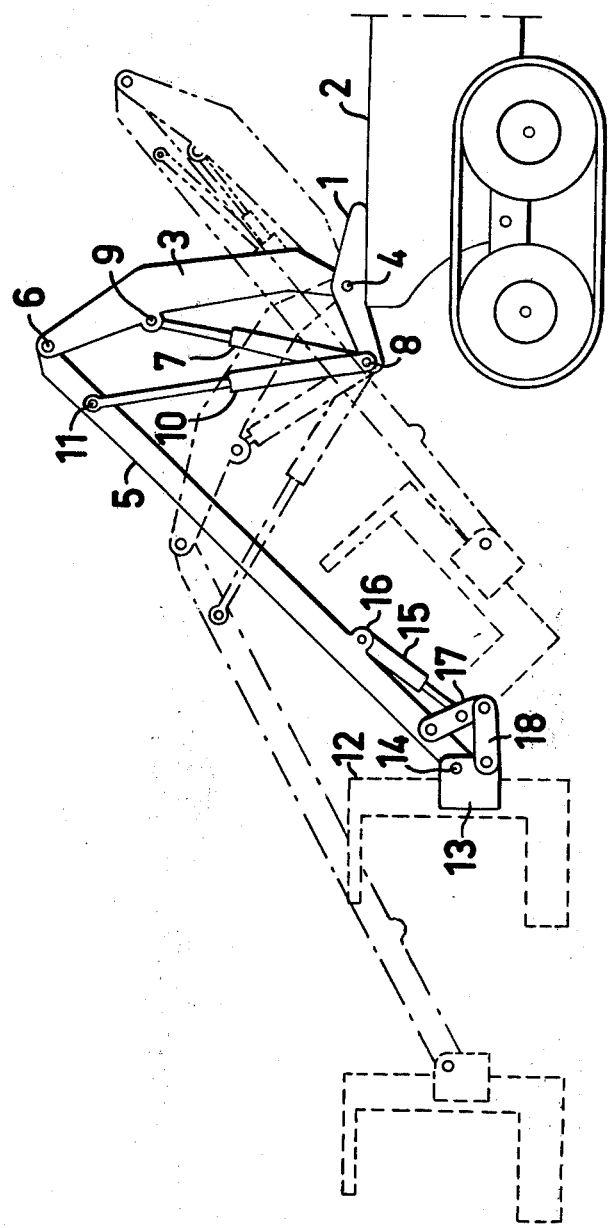

CRANE JIB ARRANGEMENT

The present invention relates to a crane jib arrangement with a base arm pivoted in a support and a jib lever pivotally connected thereto which in its free end supports a working tool such as a tree harvesting device, a first hydraulic jack being placed between a point longitudinally displaced relatively to the journal place of the base arm and a point on the base arm, and a second hydraulic jack being inserted between a point also longitudinally displaced relatively to the journal place of the base arm and a point on the jib lever.

On many occasions, perhaps especially when collecting upright trees, it is necessary to be able to project and retract the harvesting device along an essentially horizontal path. This is quite easily possible if the crane jib is of a telescopic type which, however, on one hand is relatively complicated and on the other hand does not permit collecting of trees nearer the vehicle, which is supporting the crane jib, than what corresponds to the maximally contracted telescopic jib. By its considerably simpler and slenderer design for the same load a crane jib consisting of a base arm and a jib lever will be substantially cheaper than the telescopic arm and permits tree collection as far as up to the vehicle; in the constructions hitherto known the crane operator must, however, coordinate at least two hydraulic functions in order to obtain the approximatively horizontal path for the harvesting device. This is in practice very difficult.

The aim of the invention is to combine the advantages of the two above mentioned types of crane jibs and simultaneously to eliminate the disadvantages. This takes place by the combination that said second hydraulic jack, on one hand, in a manner known per se, has its line of action extending approximately parallelly with the line through the bearing points of the base arm, and on the other hand its lower bearing point positioned at a lower level than the bearing point of the base arm, so that at a locked second hydraulic jack this has a lifting effect on the jib lever at its projection as a sonsequence of the action of the first hydraulic jack, limiting thereby the vertical motion of the free end of the jib lever to a relatively limited area.

The invention is closer described below with reference to the enclosed drawing where the FIGURE schematically in sectional view shows the arrangement according to the invention applied to a crane jib placed on the indicated rear of a cross-country vehicle.

In the shown example a crane jib support 1 is fixed on the bogie-supported rear 2 of a cross-country vehicle, as a tractor. A base arm 3 is journalled below in the point 4 on the support 1 and is in its upper end pivotally connected to a jib lever 5 in the point 6.

A first hydraulic jack 7 is inserted between a shaft 8 in the support 1 which is positioned under the level of the bearing of the base arm 4 and an ear 9 on the base arm. In correspondence with the principles of the invention a second hydraulic jack 10 is inserted between the shaft 8 of the support 1 and a point 11 so placed on the jib lever 5 that the line of action of the hydraulic jack 10 runs approximately parallelly with the line through the bearing points 4 and 6 of the base arm.

Finally the jib lever 5 is shown to support in its free end a harvesting device 12 indicated with dashed lines, which device can be of an arbitrary type. The holder 13 of the harvesting device is pivoted around a horizontal shaft 14 in the jib lever end and is controlled by means of a hydraulic jack 15 which is inserted between an ear 16 on the jib lever 5 and a link system 17, 18 actuating the holder 13. If desired the harvesting device can also be made tiltable laterally.

The tubings to and from the hydraulic jacks, 7, 10 and 15 which are of a double-acting type and the control belonging thereto have been omitted in the FIGURE in order not to jeopardize the surveyability.

If the crane jib position shown with continuous lines is considered as an initial position, it is obvious that by separate or combined operations of the two hydraulic jacks one can let the harvesting device 12 sweep over a wide area both longitudinally and vertically. Suppose now instead that one locks the hydraulic jack 10 of the jib lever in the shown position and only actuates the hydraulic jack 7 of the base arm. It is true then that the upper end of the jib lever will be lowered at 6, but the locked hydraulic jack 10 will act like a rigid link and will lift the jib lever 5, i.e. the angle between the base arm and the jib lever will be increasingly wider. This implies that one by a suitable choice of the geometric parameters can have the free end of the jib lever and thereby the harvesting device 12 to describe an essentially horizontal path by one single hydraulic operation, exactly as in a telescopic arm. A projecting position on the crane arm is shown with dash-dotted lines. By the two hydraulic jacks 7 and 10 having their respective lower ends journalled around the same shaft 8 the construction is both optimally simple and also well fitted to form a very compact "parcel" when transporting the crane jib with a favourable placing of its point of balance. This is elucidated by the position shown with double dash-dotted lines, where one has also swung up the harvesting device by aid of the hydraulic jack 15.

The invention is not limited to the embodiment described above but different modifications are obvious to a person skilled in the art. If for instance less regard is paid to so compact a transport parcel as possible, the hydraulic jack 7 of the base arm could be placed in another manner. Moreover, the distance between on the one hand the upper point 11 of the hydraulic jack 10 and the link 6 and on the other hand its lower point 8 and the bearing 4 of the base arm can be varied within rather wide limits, as long as the criterion of parallelism previously mentioned is filled. Moreover, the lower point of the jack 10 could be put on another, especially lower, level than the one shown relatively to the point 4. Obviously the sketched mechanism for the tilting motion of the harvesting device 12 could be designed in another manner.

What is claimed is:

1. A crane jib arrangement with a base arm pivoted in a support and a jib lever pivotally connected thereto, defining a lower and an upper bearing point, respectively, of the base arm, which jib lever in its free end supports a working tool such as a tree harvesting device, a first hydraulic jack being placed between a lower point longitudinally displaced relative to the journal place of the base arm and an upper point on the base arm, and a second hydraulic jack being placed between a lower point which is the same as the lower point for the first jack and an upper point on the jib lever, said second hydraulic jack having, on one hand, its line of action extending approximately parallel with a line through the bearing points on the base arm, and on the other hand, its said lower point placed at a lower level than the bearing point of the base arm, the improvement wherein the upper bearing point of said base arm is positioned at a higher level than is the said upper point of said second hydraulic jack, so that when said second hydraulic jack is locked in a substantially extended position at an effective length substantially equal to the effective length of said base arm, said second hydraulic jack has a lifting effect on the jib lever at its free end as a consequence of the retracting action of the first hydraulic jack, limiting thereby the vertical motion of the free end of the jib lever in a relatively narrow horizontal plane.

* * * * *